US010082207B2

(12) United States Patent
Eaton, Jr. et al.

(10) Patent No.: US 10,082,207 B2
(45) Date of Patent: Sep. 25, 2018

(54) PISTON ASSEMBLY

(71) Applicants: Elmer B. Eaton, Jr., Corning, NY (US); Malcolm J. Cliff, Painted Post, NY (US); John K. Sandham, Corning, NY (US); Waldo E. Burdick, Jr., Horseheads, NY (US)

(72) Inventors: Elmer B. Eaton, Jr., Corning, NY (US); Malcolm J. Cliff, Painted Post, NY (US); John K. Sandham, Corning, NY (US); Waldo E. Burdick, Jr., Horseheads, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 214 days.

(21) Appl. No.: 14/960,816

(22) Filed: Dec. 7, 2015

(65) Prior Publication Data
US 2016/0223083 A1 Aug. 4, 2016

Related U.S. Application Data

(60) Provisional application No. 62/096,068, filed on Dec. 23, 2014.

(51) Int. Cl.
*F16J 1/00* (2006.01)
*F16J 1/12* (2006.01)
(Continued)

(52) U.S. Cl.
CPC ............... *F16J 1/12* (2013.01); *F04B 53/14* (2013.01); *F16J 1/005* (2013.01); *F16J 1/008* (2013.01); *F16J 7/00* (2013.01)

(58) Field of Classification Search
CPC ....................................................... F16J 1/005
See application file for complete search history.

(56) References Cited

U.S. PATENT DOCUMENTS 2,158,591 A * 5/1939 Ramsey ................. F01B 25/10
92/246
3,101,651 A 8/1963 Strader
(Continued)

FOREIGN PATENT DOCUMENTS

CN          2557260 Y       6/2003
CN        101324245 A      12/2008
(Continued)

OTHER PUBLICATIONS

PCT International Search Report and Written Opinion dated May 3, 2016 corresponding to PCT Application PCT/US2015/064375 filed Dec. 8, 2015.

*Primary Examiner* — F. Daniel Lopez

(57) ABSTRACT

A piston assembly may include a piston rod and a piston disposed on the piston rod. The piston may include a frame end cap defining a through-bore for receiving the piston rod, and the frame end cap may form a first end of the piston. The piston may include an outer end cap defining a through-bore for receiving the piston rod, and the outer end cap may form a second end of the piston. The piston may also include a center support defining a through-bore for receiving the piston rod. The center support may be disposed between the frame end cap and the outer end cap, and an outer surface of the piston rod and an inner circumferential surface of the center support may define a radial gap.

8 Claims, 3 Drawing Sheets

(51) Int. Cl.
*F04B 53/14* (2006.01)
*F16J 7/00* (2006.01)

(56) References Cited

U.S. PATENT DOCUMENTS

| | | | | |
|---|---|---|---|---|
| 3,149,543 | A | * | 9/1964 | Naab .......................... F16J 9/28 |
| | | | | 277/434 |
| 3,927,608 | A | | 12/1975 | Doyel |
| 5,535,861 | A | | 7/1996 | Young |
| 2014/0130662 | A1 | * | 5/2014 | Kabir ........................ F16J 1/006 |
| | | | | 92/109 |
| 2015/0075368 | A1 | * | 3/2015 | Koontz ...................... F16J 1/12 |
| | | | | 92/138 |

FOREIGN PATENT DOCUMENTS

| | | |
|---|---|---|
| CN | 102829125 A | 12/2012 |
| EP | 0731268 A1 | 9/1996 |

* cited by examiner

PISTON ASSEMBLY

This application claims priority to U.S. Provisional Patent Application having Ser. No. 62/096,068, which was filed Dec. 23, 2014. The aforementioned patent application is hereby incorporated by reference in its entirety into the present application to the extent consistent with the present application.

BACKGROUND

A conventional piston assembly may often be used in a myriad of applications and industrial processes (e.g., reciprocating compressors, engines, pumps, etc.) that may expose the piston assembly and components thereof to extreme operating conditions (e.g., high temperatures, high friction, high mechanical stress, etc.). Exposure of the piston assembly and the components thereof to the extreme operating conditions may often compromise the structural integrity of one or more original equipment manufacturer (OEM) components of the piston assembly. For example, a conventional piston assembly of a reciprocating compressor may include a three-piece piston coupled with a rod and configured to be actuated within a piston chamber of the reciprocating compressor. The actuation of the three-piece piston within the piston chamber may result in galling or wearing of one or more pieces (e.g., carrier ring or sleeve) of the three-piece piston.

In view of the foregoing, the OEM components of the conventional piston assembly may often be replaced with improved aftermarket components to extend the operational life of the piston assembly. The design and/or configuration of the conventional piston assembly, however, may limit the ability to replace the OEM components with the improved aftermarket components. For example, the rod in a conventional piston assembly may require at least three lands to sufficiently align and support respective pieces of the three-piece piston.

What is needed, then, is an improved piston assembly and method for replacing components thereof.

SUMMARY

In one embodiment, a piston assembly may include a piston rod and a piston disposed on the piston rod. The piston may include a frame end cap defining a through-bore for receiving the piston rod, and the frame end cap may form a first end of the piston. The piston may include an outer end cap defining a through-bore for receiving the piston rod, and the outer end cap may form a second end of the piston. The piston may also include a center support defining a through-bore for receiving the piston rod. The center support may be disposed between the frame end cap and the outer end cap, and an outer surface of the piston rod and an inner circumferential surface of the center support may define a radial gap therebetween.

In one embodiment, a piston assembly may include a piston rod and a piston positioned on the piston rod. The piston rod may include a first land and a second land disposed between opposing axial ends thereof. The piston may include a first end cap and a second end cap forming a first end and a second end of the piston, respectively. The first end cap may be supported by the first land, and the second end cap may be supported by the second land. The piston may also include a center support disposed between the first end cap and the second end cap. The center support may not be supported by the first land or the second land.

In one embodiment, a piston assembly may include a piston rod and a piston. The piston rod may include a first land and a second land disposed between opposing axial ends thereof. The piston may include a frame end cap defining a through-bore for receiving the piston rod. The frame end cap may include an inner cylindrical surface with a circumferential recess positioned thereon, and the frame end cap may form a first end of the piston, which may be supported by the first land of the piston rod. The piston may include an outer end cap defining a through-bore for receiving the piston rod, and the outer end cap may form a second end of the piston. The outer end cap may be supported by the second land of the piston rod. The piston may further include a center support defining a through-bore for receiving the piston rod. The center support may include a sleeve configured to be disposed in the circumferential recess of the frame end cap, wherein an inner circumferential surface of the center support and an outer surface of the piston rod may define a radial gap therebetween.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
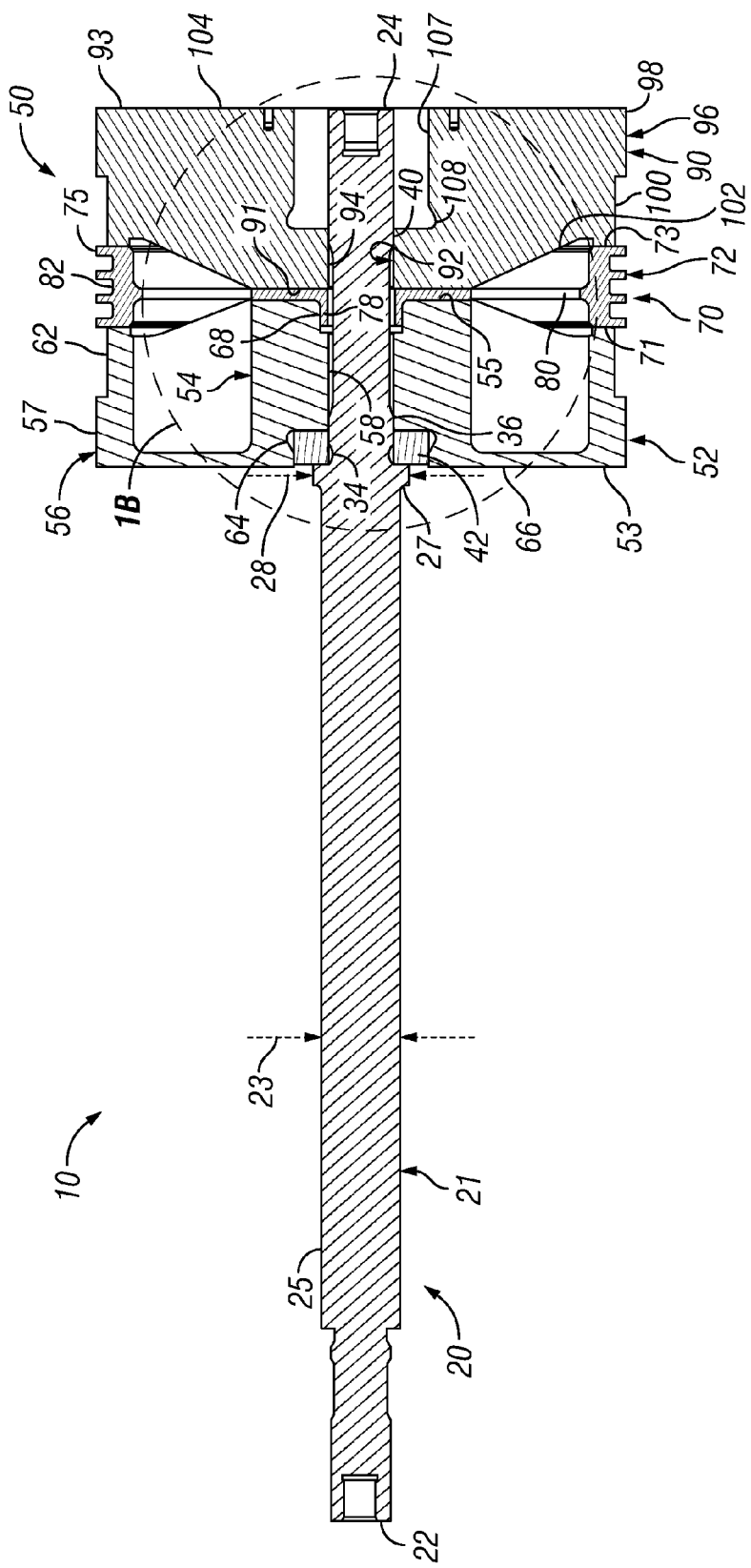
FIG. 1A shows a cross-sectional schematic of an exemplary piston assembly, according to one or more embodiments disclosed herein.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. It should also be appreciated that the term "about," as used herein, in conjunction with a numeral refers to a value that is +/−5% (inclusive) of that numeral, +/−10% (inclusive) of that numeral, or +/−15% (inclusive) of that numeral. It should further be appreciated that when a numerical range is disclosed herein, any numerical value falling within the range is also specifically disclosed. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1B:
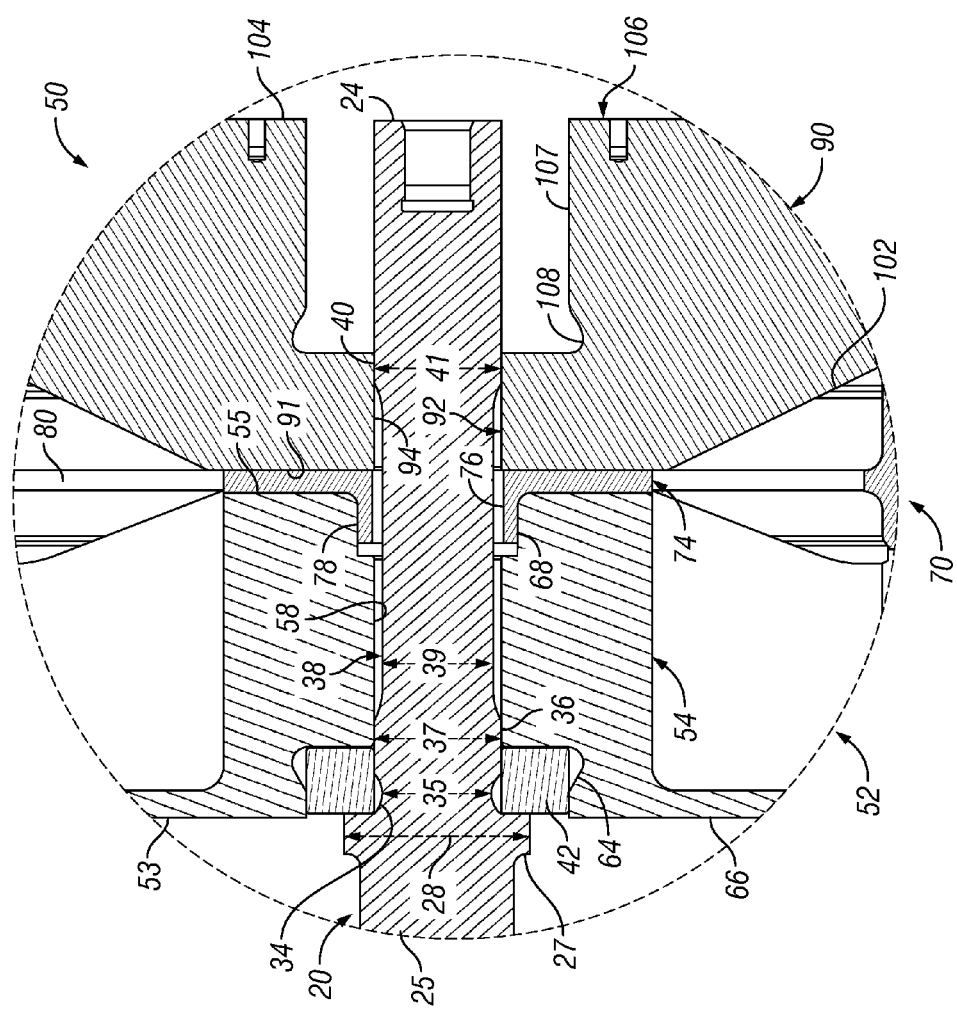
FIG. 1B is a close-up view of a portion of the piston assembly shown in FIG. 1A, according to one or more embodiments disclosed herein.

FIG. 1A shows a cross-sectional schematic view of an exemplary piston assembly 10, according to one or more embodiments. FIG. 1B shows an enlarged view of the piston assembly 10 of FIG. 1A, according to one or more embodiments. The piston assembly 10 may include one or more pistons 50 (one is shown) coupled with a piston rod 20. The piston 50 may be a multi-piece piston. For example, as illustrated in FIG. 1A, the piston 50 may be a three-piece piston including a frame end cap 52, a center support 70, and an outer end cap 90.

The piston rod 20, having a longitudinal axis, may include a generally cylindrical body 25 having a first axial end 22 and a second axial end 24. The piston rod 20 may be coupled with an engine, a pump, or a compressor proximal the first axial end 22 thereof. As shown in FIG. 1A, the piston 50 may be positioned and connected to the piston rod 20 proximal the second axial end 24 of the piston rod 20. The body 25 of the piston rod 20 may include a first portion 21 disposed between the first and second axial ends 22, 24 thereof. The body 25 may also include a shoulder 27 disposed adjacent the first portion 21 of the body 25. The shoulder 27 may be configured to axially position the piston 50 proximal the second axial end 24 of the piston rod 20. In one embodiment, a diameter 23 of the first portion 21 and a diameter 28 of the shoulder 27 may be substantially equivalent. In another embodiment, the diameter 28 of the shoulder 27 may be relatively greater than the diameter 23 of the first portion 21.

More clearly shown in the close-up sectional view in FIG. 1B, the body 25 of the piston rod 20 may include a circumferential indention 34 adjacent the shoulder 27, and proximal the second axial end 24 of the piston rod 20. The circumferential indention 34 may have a diameter 35 relatively less than the diameter 28 of the shoulder 27. The diameter 35 of the circumferential indention 34 may also be relatively less than the diameter 23 of the first portion 21 of the piston rod 20. The circumferential indention 34 may be configured to receive a collar 42.

As shown in FIG. 1B, the body 25 of the piston rod 20 may include a first land 36 proximal the second axial end 24 of the piston rod 20. The first land 36 may be disposed adjacent the circumferential indention 34. The first land 36 may have a diameter 37 relatively greater than the diameter 35 of the circumferential indention 34. The diameter 37 of the first land 36 may also be relatively less than the diameter 28 of the shoulder 27. The first land 36 may be configured to at least partially support the frame end cap 52 of the piston 50. The first land 36 may also be configured to at least partially support the collar 42.

The body 25 of the piston rod 20 may include a second land 40 proximal the second axial end 24 of the piston rod 20. As shown in FIG. 1A, the second land 40 may be adjacent the second axial end 24 of the piston rod 20. A diameter 41 of the second land 40 may be substantially equivalent to the diameter 37 of the first land 36. The second land 40 may be configured to at least partially support the outer end cap 90 of the piston 50. The body 25 of the piston rod 20 may further include a second portion 38 disposed axially between the first land 36 and the second land 40. The second portion 38 may have a diameter 39 relatively less than the diameter 37 of the first land 36 and the diameter 41 of the second land 40.

The piston 50 may include one or more separate pieces or components coupled with one another. Referring back to FIG. 1A, the piston 50 may include the frame end cap 52, the center support 70, and the outer end cap 90. As further illustrated in FIG. 1A, the frame end cap 52 may be disposed proximal the shoulder 27 of the piston rod 20. The outer end cap 90 may be disposed adjacent the second axial end 24 of the piston rod 20, and the center support 70 may be disposed between the frame end cap 52 and the outer end cap 90 of the piston 50. In one embodiment, illustrated in FIG. 2, the piston 50 may be generally hollow. In another embodiment, the piston 50 may be solid. The piston 50 may be fabricated from aluminum and may generally be hollow to reduce the weight of the piston 50. However, it is contemplated that the piston 50 could be fabricated from other materials such as an aluminum alloy, steel, or a combination of various metals. In one embodiment, the frame end cap 52, the center support 70, and the outer end cap 90 may be fabricated from materials different from one another. For example, the frame end cap 52 and the outer end cap 90 may be fabricated from aluminum, and the center support 70 may be fabricated from steel.

Figure 2:
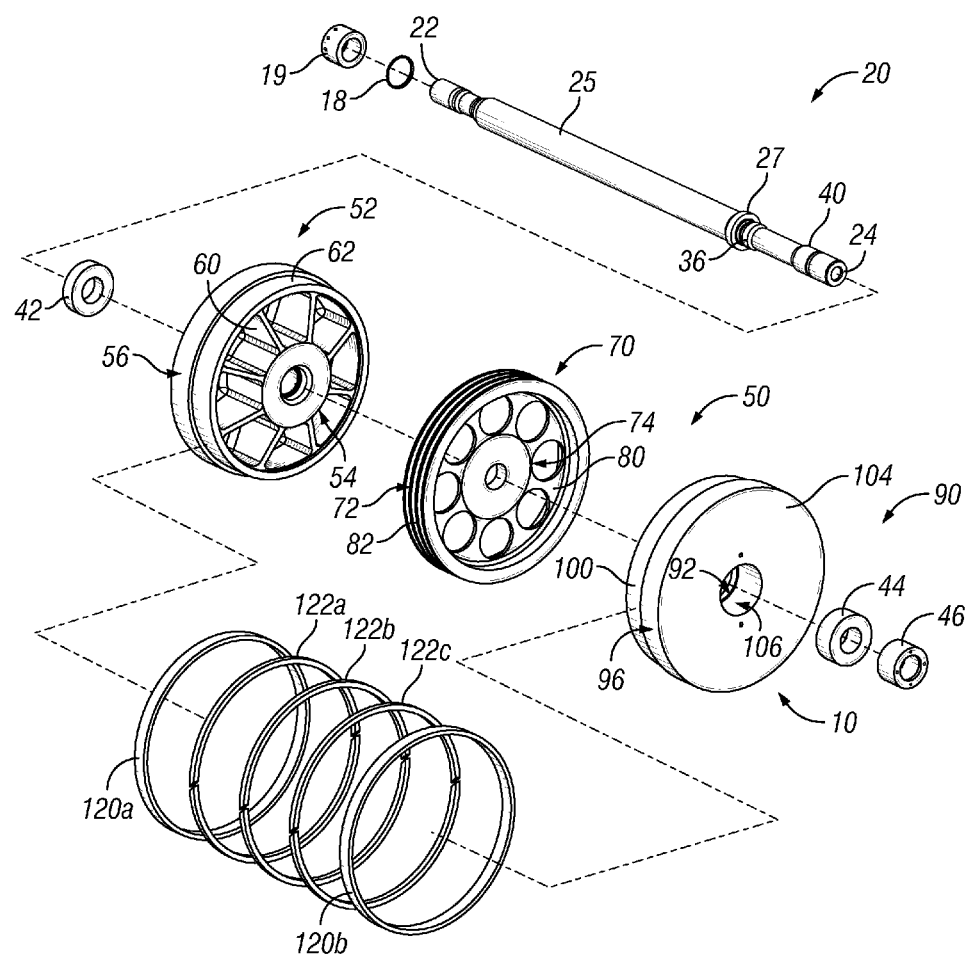
FIG. 2 is an exploded view of the piston assembly shown in FIGS. 1A-1B, according to one or more embodiments disclosed herein.

Referring back to FIG. 1A, the frame end cap 52 of the piston 50 may include a first end 53 and a second end 55. The frame end cap 52 may be centered about the longitudinal axis of the piston rod 20. The frame end cap 52 may include an inner cylindrical portion 54 with an inner circumferential surface 58. As illustrated in FIG. 1B, the inner cylindrical portion 54 of the frame end cap 52 may define a recess 68 proximal the second end 55 and configured to receive a sleeve 78 of the center support 70. The inner circumferential surface 58 may define a frame end throughbore configured to receive the piston rod 20. For example, as illustrated in FIG. 1A, the piston rod 20 may be positioned within the frame end through-bore. The frame end cap 52 may also include an outer cylindrical portion 56 with an outer circumferential surface 57. The outer circumferential surface 57 may include a circumferential ledge 62 positioned proximal the second end 55 of the frame end cap 52. The circumferential ledge 62 may be configured to receive a rider band 120a, as shown in FIG. 2. The frame end 52 may also include one or more strengthening ribs 60 positioned between the inner cylindrical portion 54 and the outer cylindrical portion 56. Referring back to FIG. 1A, the frame end cap 52 may include a frame end plate 66 forming at least a portion of the first end 53. The frame end plate 66 may be integral with the inner and outer cylindrical portions 54, 56. The frame end plate 66 may also be integral with the strengthening ribs 60.

The frame end cap 52 may also include a circumferential inset 64 positioned proximal the first end 53. The circumferential inset 64 may be defined on the inner circumferential surface 58 of the frame end cap 52 and may be configured to receive the collar 42. The collar 42 may be configured to partially secure the piston 50 to the piston rod 20, as well as absorb vibrations of the piston assembly 10. In one embodiment, the collar 42 may be fabricated from a relatively soft material, such as cast iron, such that the collar 42 may expand within the circumferential inset 64 of the frame end cap 52 and the circumferential indention 34 of the piston rod 20. As shown in FIG. 1A, in one embodiment, the frame end cap 52 may not come in contact with the shoulder 27 of the piston rod 20 because the collar 42 may be axially positioned between the shoulder 27 and the frame end cap 52.

The center support 70 of the piston 50 includes a first end 71 and a second end 73, and is disposed between the frame end cap 52 and the outer end cap 90. The center support 70 is configured to be centered about the longitudinal axis of the piston rod 20. The first end 71 of the center support 70 may be disposed adjacent the second end 55 of the frame end cap 52. The center support 70 may include an inner cylindrical portion 74 (see FIG. 1B) with an inner circumferential surface 76. The inner circumferential surface 76 defines a center support through-bore configured to receive the piston rod 20, as shown in FIG. 1A. An outer surface of the piston rod 20 and the inner circumferential surface 76 may define a radial gap therebetween. In one embodiment, the radial gap may extend from the first end 71 of the center support 70 to the second end 73 of the center support 70. In one embodiment, the piston rod 20 may not support the center support 70, and generally may not have direct contact with the center support 70.

The inner cylindrical portion 74 of the center support 70 may also include the sleeve 78 at the first end 71. The sleeve 78 may be configured to fit onto the recess 68 of the frame end cap 52. More specifically, the sleeve 78 of the center support 70 may be configured to support the frame end cap 52 of the piston 50. In another embodiment, the frame end cap 52 of the piston 50 may be configured to support the center support 70. The sleeve 78 may also be configured to align the center support 70 with the frame end cap 52. The sleeve 78 may be integral with the inner cylindrical portion 74 of the center support 70.

The center support 70 may include an outer cylindrical portion 72 with an outer circumferential surface 75. The outer circumferential surface 75 may define one or more circumferential grooves 82. The circumferential grooves 82 may be configured to receive one or more piston rings 122a, 122b, and 122c, as shown in FIG. 2. The center support 70 may also include a disc 80 extending from the inner cylindrical portion 74 to the outer cylindrical portion 72. The disc 80 may define one or more bores extending axially therethrough. The disc 80 may be integrally formed with the inner cylindrical portion 74 and the outer cylindrical portion 72.

Referring to FIG. 1A, the outer end cap 90 of the piston 50 includes a first end 91 and a second end 93, and may be positioned proximal the second axial end 24 of the piston rod 20. The outer end cap 90 may be configured to be centered about the longitudinal axis of the piston rod 20. The first end 91 of the outer end cap 90 may be disposed adjacent the second end 73 of the center support 70. The outer end cap 90 may include a first inner cylindrical portion 92 with a first inner circumferential surface 94. The first inner circumferential surface 94 may define a first outer end through-bore, which may be configured to receive the piston rod 20, as shown in FIG. 1A.

The outer end cap 90 may also include a second inner cylindrical portion 106 with a second inner circumferential surface 107. The second inner circumferential surface 107 defines a second outer end through-bore. A diameter of the second outer end through-bore may be relatively greater than the first outer end through-bore. The piston rod 20 may be at least partially disposed within the second outer end through-bore. The second inner circumferential surface 107 may define a circumferential recess 108 configured to receive a collar 44, as shown in FIG. 2. The second inner cylindrical portion 106 may also be configured to receive a mechanical fastener 46 to secure or facilitate the coupling of the piston 50 to the piston rod 20. In one embodiment, the mechanical fastener 46 may be a nut such as a tension nut.

The outer end cap 90 may also include an outer cylindrical portion 96 with an outer circumferential surface 98. The outer circumferential surface 98 may define a circumferential recess 100 disposed proximal the first end 91 of the outer end cap 90. The circumferential recess 100 may be configured to receive a rider band 120b, as shown in FIG. 2.

In one embodiment, the outer end cap 90 may have a similar configuration as the frame end cap 52. As shown in FIGS. 1A and 1B, the outer end cap 90 may include one or more strengthening ribs 102 radially disposed between the first and second inner cylindrical portions 92, 106 and the outer cylindrical portion 96. The outer end cap 90 may include an end plate 104 that may form at least a portion of the second end 93. The end plate 104 may be integrally formed with the inner and outer cylindrical portions 92, 106, 96. The end plate 104 may also be integrally formed with the strengthening ribs 102.

Referring to FIG. 2, assembly of the piston assembly 10 includes securing the piston 50 to the piston rod 20. To secure the piston 50 to the piston rod 20, a through-bore of the collar 42 may receive the piston rod 20 from the second axial end 24 until the collar 42 is disposed proximal the shoulder 27 of the piston rod 20. The through-bore of the frame end cap 52 may receive the second axial end 24 of the piston 50 until the frame end cap 52 is disposed over the collar 42. The collar 42 and/or the frame end 52 cap may be heated or cooled to position the frame end cap 52 over the collar 42. The through-bore of the center support 70 may receive the piston rod 20 from the second axial end 24 until the center support 70 is disposed adjacent the frame end cap 52. The sleeve 78 of the center support 70 may be disposed into the circumferential recess 68 of the frame end cap 52. The sleeve 78 of the center support 70 may align and support the frame end cap 52 during the assembly process. The through-bore of the outer end cap 90 may receive the piston rod 20 from the second axial end 24 until the outer end cap 90 is disposed adjacent the center support 70. A through-bore of the collar 44 may receive the piston rod 20 until the collar 44 is disposed in the circumferential recess 108 of the outer end cap 90. The nut 46 may also be positioned onto the piston rod 20 and into the second inner cylindrical portion 106 of the outer end cap 90. The nut 46 may be fastened to the piston rod 20 to thereby secure the piston 50 to the piston rod 20. The rider bands 120a and 120b and the piston rings 122a, 122b, and 122c may be positioned onto the circumferential ledges 62, circumferential recesses 100, and circumferential grooves 82. The piston assembly 10, comprising the piston rod 20 and piston 50, may then be fastened to a compressor or a pump. In one embodiment, the piston assembly 10 may be fastened to a compressor by a washer 18 and a torque nut 19. In one embodiment, the piston rod 20 may be fastened to a compressor or a pump prior to the piston 50 being secured to the piston rod 20.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A piston assembly, comprising:
a piston rod comprising: a shoulder having a diameter, first land and a second land disposed between first and second axial ends of the piston rod on one side of the shoulder, wherein diameters of the piston rod at the first and second lands are equal and smaller than the diameter of the shoulder, and diameter of the piston rod is smaller between the first and second lands; and
a piston positioned on the piston rod between the shoulder and the second axial end of the piston rod, the piston comprising:
a first end cap having first and second axial ends, the first end cap defining a circumferential recess between the first and second axial ends of the the first end cap, and
a second end cap having first and second axial ends, the first end cap and the second end cap forming a first end and a second end of the piston, respectively, wherein the first end cap is supported by the first land, and the second end cap is supported by the second land, and
a center support disposed between the first end cap and the second end cap, the center support having an outer circumferential surface contiguous with respective outer circumferential surfaces of the first end cap and the second end cap, a first axial end of the center support abutting the second axial end of the first end cap, and a second axial end of the center support abutting the first axial end of the second end cap, and a sleeve concentrically oriented within and spaced radially inwardly from the outer circumferential surface of the center support, the sleeve defining a through-bore extending between the first and second axial ends of the center support for receiving the piston rod, the sleeve positioned within the circumferential recess of the first end cap, wherein an inner circumferential surface of the through-bore and an outer surface of the piston rod define a radial gap therebetween; and
a collar positioned between the shoulder of the piston rod and the first end cap of the piston, the collar configured to expand into a circumferential indention of the piston rod and a circumferential inset of the piston.

2. The piston assembly of claim 1, wherein the radial gap extending an axial length of the center support.

3. A piston assembly, comprising:
a piston rod comprising a first land and a second land disposed between first and second axial ends of the piston rod, the first land and the second land axially separated from one another by a necked portion of the piston rod having a diameter smaller than diameters of the first and second lands; and
a piston circumscribing the piston rod over the first and second lands and the necked portion thereof, comprising:
a frame end cap having an outer circumferential surface, first and second axial ends, and defining a first through-bore between the first and second axial ends of the frame cap, for receiving the piston rod, the first through-bore defining an inner cylindrical surface with a circumferential recess having a recess diameter greater than diameter of the first through-bore, the recess formed in the second axial end of the frame cap, the outer circumferential surface and the first axial end of the frame end cap forming a first end of the piston and supported by the first land of the piston rod contacting the inner cylindrical surface of the first through-bore,
an outer end cap having an outer circumferential surface, first and second axial ends, and defining a second through-bore for receiving the piston rod, the outer circumferential surface and the second axial end of the outer end cap forming a second end of the piston, and supported by the second land of the piston rod contacting an inner cylindrical surface of the second through-bore, and
a center support oriented axially between the frame end cap and the outer end cap, having an outer circumferential surface contiguous with respective outer circumferential surfaces of the frame end cap and the outer end cap, a first axial end abutting the second axial end of the frame end cap, and a second axial end abutting the first axial end of the outer end cap, and a sleeve concentrically oriented within and spaced radially inwardly from the outer circumferential surface of the center support, the sleeve defining a third through-bore for receiving the piston rod, the sleeve oriented within the circumferential recess of the frame end cap, wherein an inner circumferential surface of the third through-bore and an outer surface of the piston rod define a radial gap therebetween.

4. The piston assembly of claim 3, wherein the sleeve is integral with the center support.

5. The piston assembly of claim 3, wherein the sleeve and the radial gap extend between the first and second ends of the center support over the necked portion of the piston rod.

6. The piston assembly of claim 3, wherein:
the piston rod includes a shoulder positioned between the first and second axial ends of the piston rod, and
the piston is disposed on the piston rod between the shoulder and the second end of the piston rod.

7. The piston assembly of claim 6, wherein:
the frame end cap is disposed proximate the shoulder of the piston rod, and
the outer end cap is disposed adjacent the second end of the piston rod.

8. The piston assembly of claim 7, wherein a collar is positioned between the frame end cap and the shoulder of the piston rod.

* * * * *